Feb. 2, 1960 A. L. BINKLEY 2,923,058
GRASS SHEARS
Filed June 16, 1959
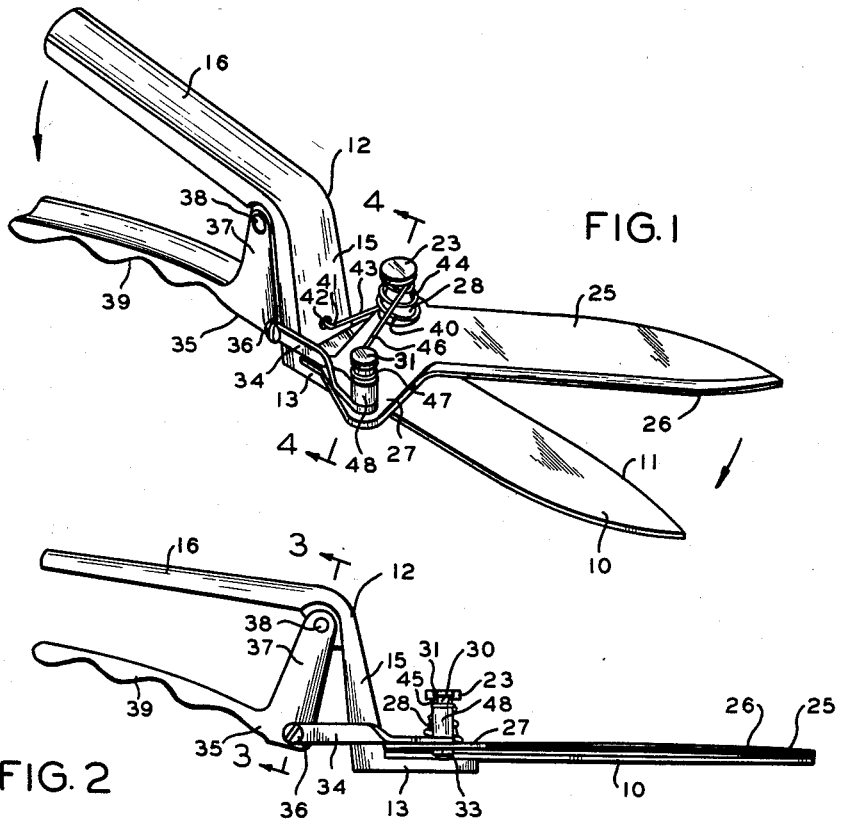
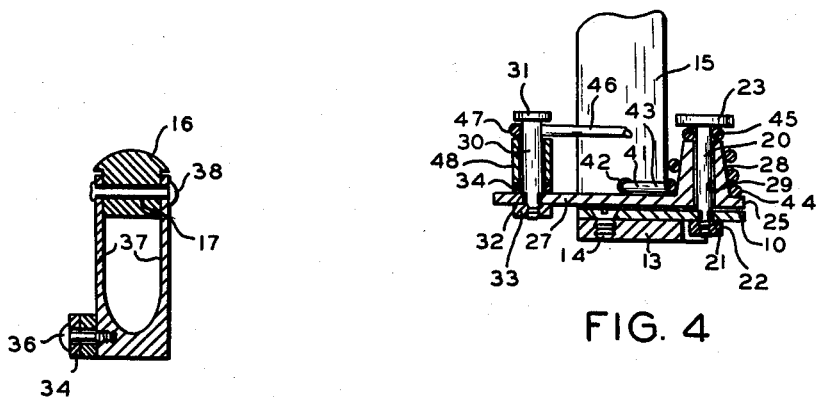
INVENTOR.
ALBERT L. BINKLEY.
BY
B T Wolbensmith
ATTORNEY

United States Patent Office 2,923,058
Patented Feb. 2, 1960

2,923,058

GRASS SHEARS

Albert L. Binkley, Reading, Pa., assignor to International Shear Corporation, Reading, Pa., a corporation of Pennsylvania Application June 16, 1959, Serial No. 820,652

5 Claims. (Cl. 30—248)

This invention relates to grass shears, and more particularly to grass shears having a pair of blades with an improved mounting of the blades and an improved resilient interconnection between said blades.

It is the principal object of the present invention to provide shears which are easy to operate, effective in their action and in which one blade is mounted for sliding and pivotal movement with respect to the other blade.

It is a further object of the present invention to provide shears having handle portions connected by a horizontal pivot in which the cutting portions of the blades tend to move closer together with increasing resistance of the material to be cut.

It is a further object of the present invention to provide shears having a pair of blades, one of which is movable with respect to the other, the blades having an interposed multipurpose spring which normally tends to urge the blades to separated positions for the access of material such as grass to be cut therebetween, and simultaneously urges one of the blades in a direction normal to the plane of the blade and towards the other blade.

Other objects and advantageous features of the invention will be apparent from the description and claims.

The nature and characteristic features of the invention will be more readily understood from the following description, taken in connection with the accompanying drawings forming part thereof, in which:

Figure 1 is a view in perspective of shears in accordance with the invention;

Fig. 2 is a side elevational view of the shears illustrated in Fig. 1;

Fig. 3 is a sectional view taken approximately on the line 3—3 of Fig. 2; and

Fig. 4 is a fragmentary sectional view, enlarged, taken approximately on the line 4—4 of Fig. 1.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings a fixed blade 10 is provided having a cutting edge portion 11. The blade 10 is secured in any desired manner to a fixed handle 12 having a flat section 13 to which the blade 10 is secured in any desired manner such as by one or more fastening screws 14. The handle 12 also has an upwardly inclined section 15 and an upwardly inclined gripping portion 16 extending from the inclined section 15.

The handle 12 can be made as an integral casting, forging or the like, and has a transverse horizontally disposed pivot pin receiving opening 17 for purposes to be explained.

The fixed blade 10 has a pivot pin 20 extending upwardly therefrom with a shoulder 21 engaging the upper face of the blade 10 and held in position by a nut 22 disposed below the blade 10. The pivot pin 20 has an enlarged head 23 at the upper end thereof.

A movable blade 25 is provided bowed slightly between its ends as in Fig. 2 and having a cutting edge portion 26 and a transverse extension 27. The blade 25, offset to one side and back of the cutting edge portion 26 has an upstanding boss 28 integral therewith or rigidly and permanently secured thereto. The exterior of the boss 28 is preferably of tapered or frusto-conical shape. The interior of the boss 28 is provided with a vertical opening 29 through which the pivot pin 20 extends, and the opening 29 of the boss 28 and pin 20 have a relatively loose fit to permit rocking of the boss 28 with respect to the pin 20, for purposes to be explained.

The blade 25 also has mounted on the transverse extension 27, and located on the opposite side of the cutting edge portion 26 from the boss 28, a pin 30 having an enlarged head 31. The pin 30 has a shoulder 32 engaging the upper face of the extension 27 and is held in position by a nut 33. An actuating link 34 mounted on the pin 30 extends to a movable handle 35 to which it is pivotally connected by a pin 36 extending through the rear end of the link 34 and into threaded engagement with the movable handle 35.

The movable handle 35 has a bifurcated arm portion 37 extending therefrom for pivotal connection to the fixed handle 12 by a pivot pin 38 extending through the pivot pin opening 17. The movable handle 35 has a gripping portion 39 for manual engagement, the portion 39 being movable about the pivotal axis provided by the pivot pin 38 towards and away from the gripping portion 16.

In order to urge the free end of the movable blade 25 away from the free end of the fixed blade 10 to move the shears for the reception of grass and the like therebetween, a spring 40 is provided which has one end portion 41 hooked into an opening 42 within the fixed handle 12, has a connecting portion 43 extending from the end portion 41 to a conical portion 44 extending around the boss 28, has a loop portion 45 around the top of the boss 28 and the pin 20 and beneath the head 23, and has a connecting portion 46 extending from beneath the head 23 of the pin 20 to a loop portion 47 around the pin 30 below its head 31. A spacer 48 can be provided on the pin 30 between the link 34 and the loop 45 of the spring 40 for retaining the spring 40 and the link 34 in their respective vertical positions on the pin 30.

The mode of operation will now be pointed out.

When it is desired to operate the shears, the same are grasped in the hand with the hand in engagement with the gripping portions 16 and 39, respectively, and with the fixed blade 10 horizontal and at the location where the cutting is to be effected. As the gripping portions 16 and 39 are squeezed together, the movement of the movable handle 35 is effective for applying a force on the actuating link 34 which is applied in turn against the pin 30 and to the transverse extension 27 of the movable blade 25 to swing the blade 25 about its pivotal support on the pin 20. As the free end of the blade 25 is moved towards the free end of the blade 10, this movement is effective to draw the cutting edge 26 in shearing relation along the cutting edge 11. The loose pivotal mounting of the blade 25, arising out of the provision of the boss 28 in loosely fitting relation to the pin 20, permits a slight rocking action which with the location of connection of the link 34 draws the blade 26 downwardly to a limiting extent to aid in retaining the edge 26 in close shearing relation to the cutting edge 11.

As the movable blade 26 is moved in generally clockwise direction as seen in Fig. 1, the spring 40 tends to wind additionally by reason of the connection of the end loop 47 thereof to the pin 30 and the other end portion 41 thereof in the opening 42. At the same time the disposition of the loop portion 45 and the conical portion 44 tend to resiliently urge the boss 28 and the portion of the blade 25 contiguous thereto downwardly on the pin 20 to insure a proper shearing action.

Upon release of the pressure applied on the gripping portion 39, the blade 25 will be urged to open position by the spring 40 while at the same time the engagement of the edge 26 with the edge 11 is relieved, thereby reducing wear and facilitating ease of operation. The location of the spring 40 in the location shown also tends to minimize pinching of the fingers in use and permits of using a lighter spring than would be possible with the spring located between the gripping portions 16 and 39.

I claim:

1. Grass cutting shears having a pair of blades horizontally movable relative to one another and having cooperating cutting edges, a pair of pivotally connected handles vertically movable relative to one another, one of said blades being fixed to one of said handles, means for actuating the other of said blades comprising a link pivotally connected to the other of said handles and said one of said blades, said other blade having a loose pivotal connection with respect to said one blade spaced above said other blade, and a resilient member having one end in engagement with said one handle and extending to said pivotal mounting and therefrom to an anchored location above the connection of said actuating link to said one blade.

2. Grass cutting shears having a pair of blades horizontally movable relative to one another and having cooperating cutting edges, a pair of pivotally connected handles vertically movable relative to one another, the lower of said blades being fixed to the upper of said handles, means for actuating the upper of said blades comprising a link pivotally connected to the lower of said handles and to the upper of said blades, said upper blade having a loose pivotal connection with respect to said lower blade spaced above said lower blade, and a resilient member having one end in engagement with the fixed handle and extending to said pivotal connection and therefrom to an anchored location above the connection of said actuating link to said upper blade.

3. Grass cutting shears having a pair of blades horizontally movable relative to one another and having cooperating cutting edges, a pair of pivotally connected handles movable relative to one another in a vertical plane, the lower of said blades being fixed to the upper of said handles, means for actuating the upper of said blades comprising a link pivotally connected to the lower of said handles and to the upper of said blades, said upper blade having a loose pivotal connection with respect to said lower blade spaced above said lower blade, and a resilient member urging the free ends of the blades away from each other and disposed forwardly of said handles and above said blades, said resilient member having one end in engagement with the fixed handle and extending to said pivotal connection and therefrom to an anchored location above the connection of said actuating link to said upper blade.

4. Grass shears having a pair of blades movable relative to one another in a horizontal plane and having cooperative cutting edges, a pair of pivotally connected handles movable relative to one another in a vertical plane, the upper of said handles having a forwardly extending portion to which one of said blades is fixedly secured, pivotal mounting members for movably mounting the other of said blades on said fixed blade including a pin carried by the fixed blade and offset to one side of the cutting edge of the fixed blade, the movable blade having a boss extending upwardly therefrom in loose pivotal engagement with said pin, said movable blade having a transverse extension with a pivot pin extending upwardly therefrom, a link pivotally connected to a movable one of said handles and to said pivot pin, and a spring having one end engaged in one of said handle portions and extending to and around said boss and then to and in engagement with said pivot pin for simultaneously urging the movable blade to a position with its free ends separated from the free end of the fixed blade and urging said movable blade downwardly with respect to its loose pivotal connection.

5. Grass shears having a pair of blades movable relative to one another in a horizontal plane and having cooperative cutting edges, a pair of handles pivotally connected by a horizontal pivot and movable relative to one another in a vertical plane, the upper of said handles having a forwardly extending portion to which one of said blades is fixedly secured, pivotal mounting members for movably mounting the other of said blades on said fixed blade including a pin carried by the fixed blade and offset to one side of the cutting edge of the fixed blade, the movable blade having a boss extending upwardly therefrom in loose pivotal engagement with said pin, said movable blade having a transverse extension with a pivot pin extending upwardly therefrom and offset to the opposite side of the cutting edge of the movable blade, a link pivotally connected to a movable one of said handles and to said pivot pin, and a spring having one end engaged in one of said handle portions and extending to and around said boss and then to and in engagement with said pivot pin for simultaneously urging the movable blade to a position with its free end separated from the free end of the fixed blade and urging said movable blade downwardly with respect to its loose pivotal connection.

No references cited.